(12) United States Patent
Kuenstler et al.

(10) Patent No.: US 6,829,888 B2
(45) Date of Patent: Dec. 14, 2004

(54) METHOD FOR CONTROLLING THE STARTING OF AN INTERNAL COMBUSTION ENGINE

(75) Inventors: Johannes Kuenstler, Aachen (DE); Paul Eduard Moraal, Vaals (NL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,963

(22) Filed: Sep. 4, 2002

(65) Prior Publication Data

US 2003/0056497 A1 Mar. 27, 2003

(30) Foreign Application Priority Data

Sep. 26, 2001 (EP) ............................................. 01122986

(51) Int. Cl.⁷ ................................................. F01N 3/00
(52) U.S. Cl. .......................... 60/284; 60/274; 60/280; 60/285; 60/300; 123/568.11; 123/568.17; 180/65.2
(58) Field of Search ........................... 60/274, 278, 280, 60/284, 286, 300, 303, 285; 123/568.11, 568.17; 180/65.2

(56) References Cited

U.S. PATENT DOCUMENTS

| | | | | |
|---|---|---|---|---|
| 5,265,418 A | | 11/1993 | Smith | |
| 5,553,451 A | * | 9/1996 | Harada | 60/277 |
| 5,716,586 A | * | 2/1998 | Taniguchi | 422/173 |
| 5,785,138 A | * | 7/1998 | Yoshida | 180/65.2 |
| 5,848,530 A | * | 12/1998 | Matsuoka et al. | 60/277 |
| 5,904,902 A | * | 5/1999 | Matuoka et al. | 422/174 |
| 5,908,019 A | * | 6/1999 | Fukuchi et al. | 123/339.18 |
| 5,916,130 A | * | 6/1999 | Nakae et al. | 60/276 |
| 5,966,931 A | * | 10/1999 | Yoshizaki et al. | 60/284 |
| 6,059,057 A | * | 5/2000 | Yamazaki et al. | 180/65.2 |
| 6,304,815 B1 | * | 10/2001 | Moraal et al. | 701/115 |
| 6,321,530 B1 | * | 11/2001 | Hoshi et al. | 60/274 |

FOREIGN PATENT DOCUMENTS

| | | |
|---|---|---|
| DE | 10001992 A1 | 7/2001 |
| EP | 1035313 A2 | 2/2000 |
| EP | 1074702 A1 | 7/2000 |

* cited by examiner

*Primary Examiner*—Binh Q. Tran
(74) *Attorney, Agent, or Firm*—Diana D. Brehob

(57) ABSTRACT

The invention relates to the starting of an internal combustion engine. The engine is coupled to an exhaust aftertreatment device that has a minimal threshold temperature for proper operation. Within a certain period of time after engine start, the load on an electrical generator driven by the engine is increased. Also, the air intake is throttled to reduce the intake manifold pressure to a target pressure. Both measures provide faster engine and catalyst warm-up and, thus, reduced emissions, particularly for a diesel engine in connection with an oxidation catalyst.

17 Claims, 1 Drawing Sheet

METHOD FOR CONTROLLING THE STARTING OF AN INTERNAL COMBUSTION ENGINE

BACKGROUND OF INVENTION

1. Field of the Invention

The present invention relates to a method for controlling the starting of an internal combustion engine comprising an exhaust aftertreatment device that requires a minimal threshold temperature for proper operation. Moreover, the invention relates to a system comprising an internal combustion engine, an exhaust gas aftertreatment device, an electrical generator, and an engine controller.

2. Background and Summary of the Invention

During the last few years, regulations for the protection of the environment have become increasingly stringent. This makes it more and more difficult to meet legal requirements, though exhaust aftertreatment devices like three-way catalysts, conventional oxidation catalysts, and particulate filters are standard today.

According to a first aspect of the invention, a method for controlling the starting of an internal combustion engine is provided. The engine is coupled to an exhaust aftertreatment device that has a minimal threshold temperature for proper operation. During a certain period of time after engine start, the following steps are performed: a) increasing the electrical load of an electrical generator that is driven by the engine; and b) throttling the air intake to reduce the intake manifold pressure to a target pressure.

During warm-up of the engine, the aftertreatment device is possibly cold and, therefore, not at its optimal working range or possibly not operative at all. Exhaust gases are therefore released into the atmosphere essentially untreated. This leads to high emissions during engine start, which represent a considerable fraction of the total emissions of the internal combustion engine. An advantage of the present method is a considerable reduction in emissions of the internal combustion engine by focusing on the starting period of the engine.

The method according to the present invention causes additional power to be consumed by the loads that are coupled to the generator. This leads to a higher load for the engine which, in turn, results in faster warm-up of the exhaust gases. Thus, the period of time during which the aftertreatment device is not operative is reduced. Throttling contributes further to this effect because throttling air flow through the engine means that less mass has to be heated with a given amount of energy, yielding higher combustion temperatures in the cylinders. Furthermore, efficiency of the engine is reduced, partially due to an increase in pumping losses. A higher fuelling rate is used to provide the desired torque, thus leading to a higher temperature of the exhaust gases.

The electrical loads that are coupled to the generator preferably comprise electrical consumers that are present in a vehicle anyway, e.g., at least one glow plug of the engine or an electrical heater of the cabin or the windshield. The advantage of said consumers is that their short-term operation as additional load will not be noticed by the driver.

According to another aspect of the invention, exhaust gas recirculation is reduced or stopped during throttling. Due to the reduction of the intake manifold pressure, the pressure difference between intake manifold and exhaust manifold increases, which may lead to an excessive amount of exhaust gas recirculation. This excessive exhaust gas recirculation is prevented by reducing or stopping exhaust gas recirculation, i.e., by closing the exhaust gas recirculation valves.

If a turbine with variable geometry is present in the engine, it may be operated open-loop only during throttling. This prevents turbocharger over-speed which might result from throttling the intake while attempting to stabilize intake manifold pressure.

Preferably, the desired exhaust temperature is attempted by increasing electrical load on the generator alone. If this does not succeed, however, throttling is also carried out. The decision to include throttling is preferably based on the exhaust temperature downstream of the aftertreatment device. Thus, throttling is carried out if the exhaust gas temperature downstream of the aftertreatment device is below a given threshold temperature.

The goal of the method, according to the present invention, is to reach a temperature of the exhaust gas that is above the threshold temperature for proper operation of the aftertreatment device as soon as possible after starting the engine. Consequently, increasing the electrical load and throttling are preferably stopped if the exhaust gas temperature has reached this threshold, thus limiting the time spent within the exceptional engine mode of steps a) and b).

To avoid undesirable implications of increasing electrical load on the generator and throttling, they are preferably carried out only when the temperature of the engine at start is within a certain temperature interval, i.e., not too high and not too low.

Preferably, the combustion engine is a diesel engine and the aftertreatment device comprises an oxidation catalyst. Presently, diesel engines emit most of their cycle emissions of CO and HC during engine and catalyst warm-up. The oxidation catalyst does not convert the CO and HC leaving the engine until it has reached a temperature of about 200° C. Therefore, the advantages of the present invention are most prominent in conjunction with such a diesel engine and an oxidation catalyst. Here, a considerable reduction in total emissions can be achieved.

The above advantages and other advantages, objects, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
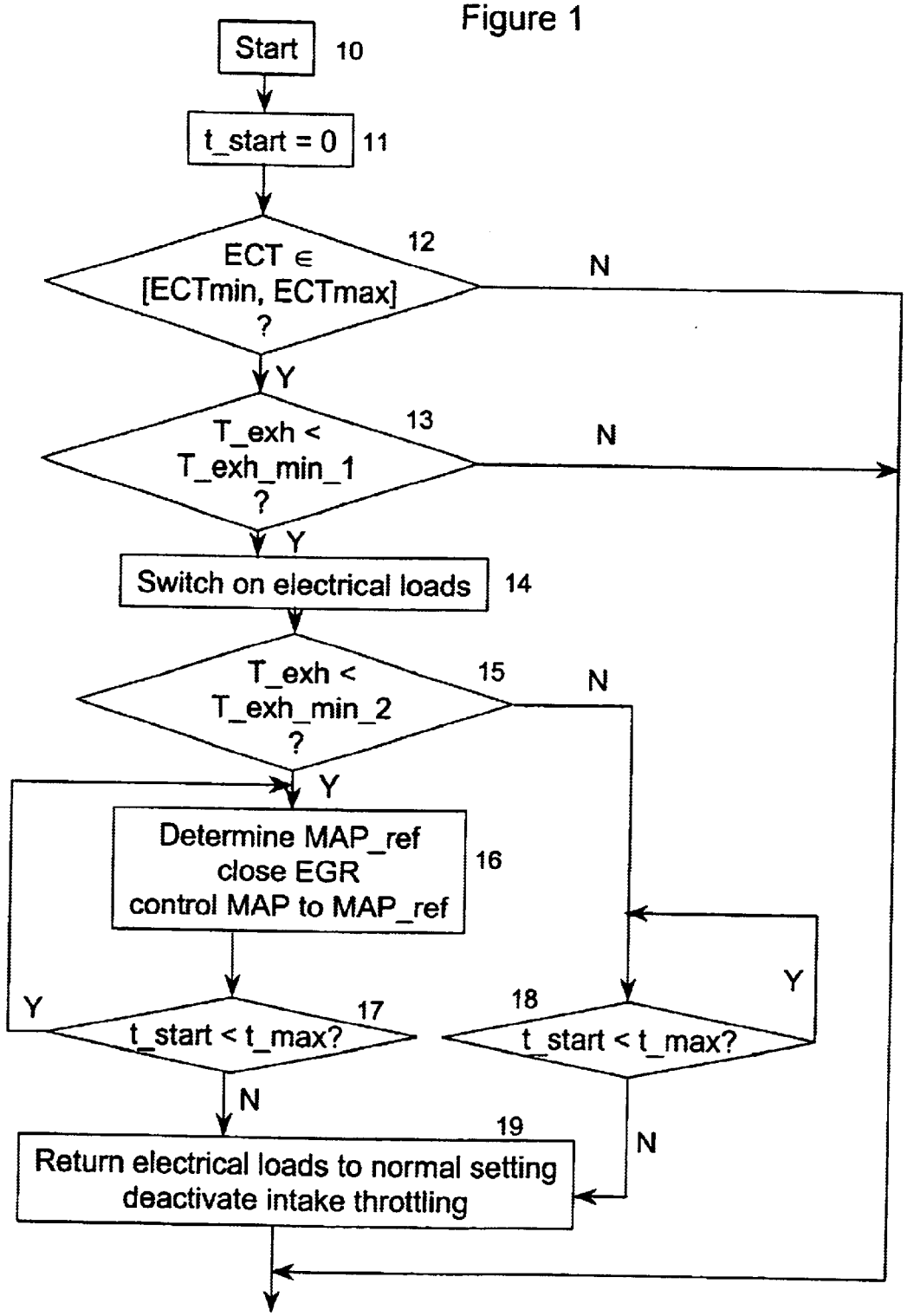
FIG. 1 shows a flowchart of a method to control the starting of an internal combustion engine according to the principles of the present invention.

The inventive method provides rapid increase in the exhaust gas temperature after engine start to improve catalyst performance. The method will be described with reference to a preferred implementation that comprises a diesel engine equipped with an exhaust gas recirculation (EGR) system, an intake air throttle, an oxidation catalyst, and a temperature sensor downstream of that catalyst. Moreover, the engine comprises an engine control unit (ECU), which is programmed with the necessary software to execute the inventive algorithm. The algorithm is executed as part of the overall engine control strategy at a fixed sampling rate, e.g., once every 16 ms.

Referring to FIG. 1, the algorithm beings in block 10. Control passes to block 11 in which the ECU initializes a timer, t_start, to zero, in block 11.

If the engine coolant temperature, ECT, is not within a range [ECT_min, ECT_max], the algorithm is terminated in block 12 to minimize impact on drivability and performance. ECT_min and ECT_max are calibratable.

If the engine coolant temperature, ECT, is within said range, the algorithm checks in block 13 the catalyst outlet temperature, T_exh. If T_exh is below a first predetermined threshold, T_exh_min_1, for example, 200° C., electrical loads are switched on in block 14 to place a higher load on the engine and thus increase engine out exhaust gas temperature. Preferably, the loads which are switched on are those that are not noticeable by the driver such as a windshield heater or glow plugs.

Once the exhaust gas temperature exceeds the first threshold T_exh_min_1, the electrical loads are switched back to their default or driver selected values.

Next, the algorithm checks in block 15 whether the catalyst temperature T_exh is below a second calibratible threshold T_exh_min_2, for example, 150° C. If so, the additional electrical loads will not raise the exhaust gas temperature sufficiently and the intake throttling feature is activated in block 16. The intake throttle is used to lower the intake manifold pressure (MAP) to a target pressure, MAP_ref, which is a function of speed and load. During this throttling, the EGR valve is closed and the variable geometry turbine (VGT) is operated in open loop control only.

The algorithm is terminated in block 17 or 18 after a calibratible period of time, t_max.

In an alternative embodiment without an exhaust gas temperature sensor, the checks on T_exh_min_1 and T_exh_min_2 of blocks 13 and 15 are not performed. The algorithm is executed until the timer has reached the maximum value t_max.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for controlling the starting of an internal combustion engine having an exhaust aftertreatment device with a minimal threshold temperature for proper operation, the method comprising:

increasing an electrical load on an electrical generator that is driven by the engine; and throttling an air intake of the engine to reduce an intake manifold pressure to a target pressure wherein the method is performed within a predetermined time period after engine start.

2. The method of claim 1 wherein the electrical load of said generator comprises at least one glow plug disposed in the engine.

3. The method of claim 1 wherein the electrical load of said generator comprises an electrical heater.

4. The method of claim 1 wherein the engine has an exhaust gas recirculation system in which exhaust gases are conducted from an engine exhaust to an engine inlet via an exhaust gas recirculation valve, further comprising reducing a quantity of exhaust gases recirculated in response to said throttling.

5. The method of claim 1 wherein said throttling is discontinued when a gas temperature downstream of the aftertreatment device is below a threshold temperature.

6. The method of claim 1, further comprising: discontinuing said increasing and said throttling when an exhaust gas temperature downstream of the aftertreatment device is greater than said threshold temperature for proper operation of the aftertreatment device.

7. The method of claim 1 wherein said increasing the electrical load and said throttling are carried out only when a temperature of the engine is within a predetermined temperature interval.

8. A system for controlling an internal combustion engine, the engine having an exhaust gas aftertreatment system, an electrical generator coupled to the engine, and a throttle valve disposed in an inlet of the engine, the system comprising:

an engine controller, the controller increasing an electrical load on the electrical generator, the controller further closing, partially, the throttle valve wherein said throttle closing causes a pressure in the engine intake to reduce to a target pressure.

9. The system of claim 8 wherein the engine is a diesel engine.

10. The system of claim 8 wherein the aftertreatment device is an oxidation catalyst.

11. The system of claim 8, further comprising an exhaust gas recirculation system in which exhaust gases are conducted from an engine exhaust to an engine inlet via an exhaust gas recirculation valve coupled to said controller, wherein said controller causes an amount of flow through said exhaust gas recirculation valve to reduce in response to said throttle closing.

12. The system of claim 8 wherein said controller causes said throttle closing when an exhaust gas temperature downstream of the exhaust aftertreatment device is below a threshold temperature.

13. The system of claim 7, further comprising glow plugs disposed in engine cylinders wherein said electrical load is placed on said electrical generator by said glow plugs.

14. The system of claim 7, further comprising an electrical heater disposed in a vehicle in which the engine is also disposed where said electrical load is placed on said electrical generator by said glow plugs.

15. A method for controlling an internal combustion engine driving in a electrical generator, the engine having an exhaust aftertreatment device disposed in an engine exhaust, the engine also having a throttle valve disposed in an engine inlet, the method comprising:

increasing an electrical load placed on the electrical generator; and closing, partially, the throttle valve wherein said throttle closing is accomplished to provide a target pressure in the engine inlet.

16. The method of claim 15 wherein said increasing and said closing are performed within a predetermined time period after the engine is started.

17. The method of claim 15 wherein said engine aftertreatment device is an oxidation catalyst having a minimum threshold temperature for proper operation.

* * * * *